June 22, 1948.  H. S. BOZORTH, JR  2,443,946
GRIP CLASP FOR FISHING RODS
Filed Nov. 14, 1945
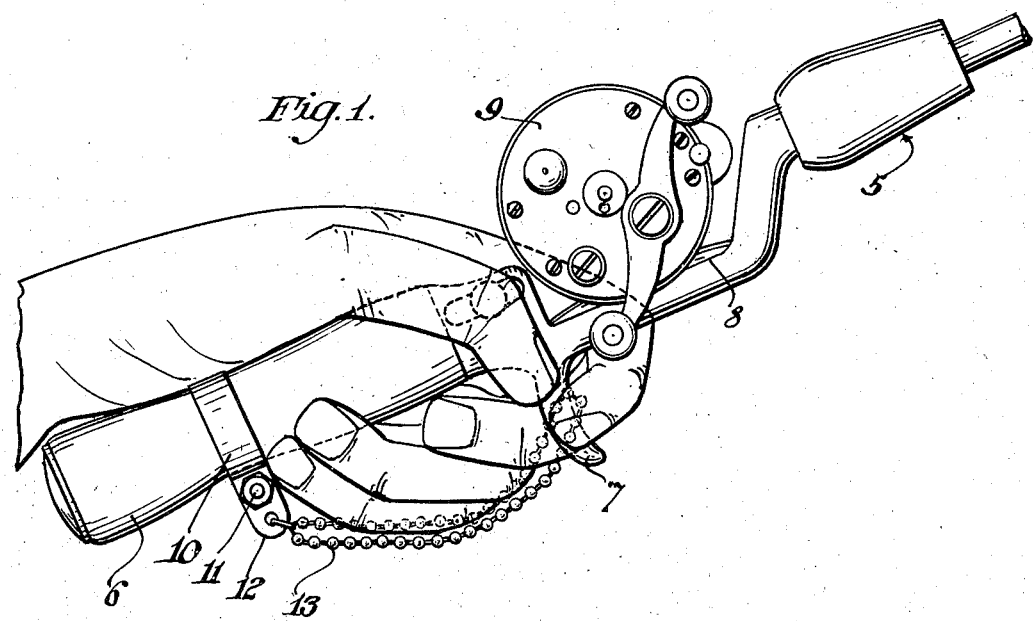
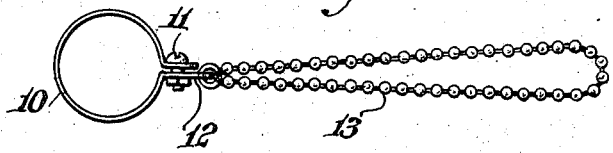
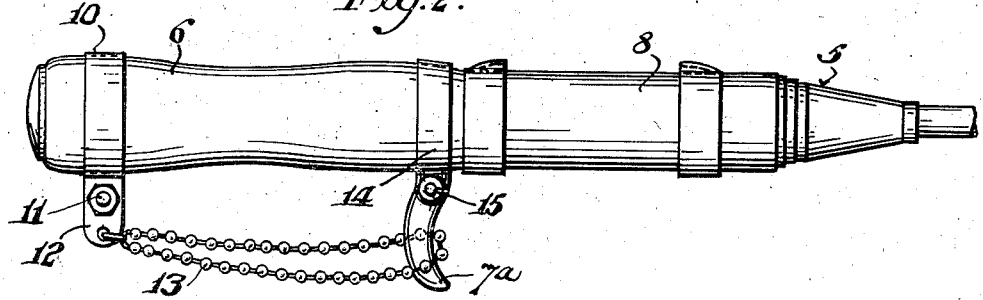
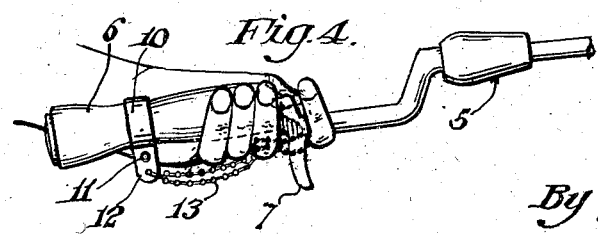
Inventor:
Harry S. Bozorth, Jr.,
By W. W. Williamson
Attorney.

Patented June 22, 1948

2,443,946

UNITED STATES PATENT OFFICE 2,443,946

GRIP CLASP FOR FISHING RODS

Harry S. Bozorth, Jr., Upper Darby, Pa.

Application November 14, 1945, Serial No. 628,486

1 Claim. (Cl. 43—25)

My invention relates to a new and useful grip clasp for fishing rods and has for one of its objects to provide means for loosely attaching the handle or hand hold portion of a fishing rod to a person's hand to prevent accidental loss of the rod.

Where a person uses a rod for casting, as from a boat, pier, bridge or the shore, into the ocean or a deep creek, as when trout fishing, wide ponds, lakes and the like, the hands often become wet and where a large weight or dipsy is used, or a large or very gamy fish makes a sudden strike, the rod is often thrown away or pulled out of the hand and sometimes lost. Many rods and reels are exceedingly expensive and fishermen do not want to lose them, therefore an object of my invention is to provide a simple and inexpensive grip clasp that can be attached to the handle or hand hold portion of any rod and fastened over some of the fingers of the hand so as to be, in effect, anchored thereto.

Another object of the invention is to provide a clamping element and a flexible member to be attached to the handle of a fishing rod by means of the clamping element and coacting with the finger rest of the rod to embrace some of the fingers of the operator's hand and to be temporarily held in place by others of his fingers.

Another object of the present invention is to provide a grip clasp including two clamps to be mounted on the handhold or handle portion of a fishing rod, one of said clamps including a hook or latch member and a flexible means secured to the other clamp member and adapted to cooperate with the hook and to be temporarily held thereon by certain fingers of the operator's hand while embracing other fingers of the same hand.

With the above and other objects in view, this invention consists of the details of construction and combinaton of elements herein shown and described and then designated by the claim.

In order that those skilled in the art to which this invention appertains may understand how to make and use the same, I will describe its construction in detail, referring by numerals to the accompanying drawing forming a part hereof, in which:

Fig. 1 is a view of the handle end of a fishing rod grasped by the hand and illustrating an embodiment of my invention.

Fig. 2 is a side view of the handle end of a fishing rod showing a modified form of the invention.

Fig. 3 is an edge view of the clamp and flexible member.

Fig. 4 is a view somewhat similar to Fig. 1 on a reduced scale and in a slightly different position and without the reel.

In carrying out my invention as herein embodied 5 represents a portion of a fishing rod, particularly the handle end thereof and includes, specifically, the handhold 6 at the forward end of which is located the finger rest hook or keeper 7, and just beyond the location of said hook is a seat 8 to receive a reel 9.

A split ring or clamp 10 is mounted on the handhold 6 of the fishing rod adjacent the rear end thereof and is securely held in place by a suitable securing means 11, such as a bolt and nut. This clamp or ring is provided with an extension or lug 12 fashioned to provide an eye for connection thereto of the flexible finger engaging means 13, for example, a chain. This flexible finger engaging means may be a double strand member to form a loop, or it can be of single strand throughout a portion thereof and have a loop formed at the free end.

Where the fishing rod is devoid of the hook 7, one is supplied as is illustrated in Fig. 2, where it is designated by the numeral 7a. In this case the hook is formed with and/or carried by the split ring or clamp 14, similar to the ring or clamp 10, and like the latter also surrounds the handhold of the fishing rod and is securely fixed thereto by a suitable fastening means 15, such as a bolt and nut.

In practice, the hand hold is grasped by the fisherman as shown in Figs. 1 and 4 and the flexible finger engaging means 13 is passed around the outside of the little and third fingers and then looped on the hook. Thereafter, the second and index fingers are brought up with the hook between them and said fingers engage the looped end of the flexible finger engaging means to retain the same on the hook. After the cast has been made, the index and second fingers may be disengaged from the flexible finger engaging means and the latter permitted to disengage from the hook or actually be pushed from the same. This will give the fisherman freedom for changing the rod from one hand to the other, or accomplishing such other things as he may desire.

The grip clasp may be retained in operative position even after the cast has been made, so that while relaxed, should a fish suddenly make a strike, the pull of the line will not dislodge the rod from the hand.

While I have described a grip clasp in connection with a fishing rod only, it will be obvious that such a device may be used in connection with other devices that are held in the hand and swung about with considerable force, and therefore I do not wish to be limited to the particular application of the invention, nor the specific details of construction herein shown and described, as these may be varied within the scope of the appended claim without departing from the spirit of my invention.

Having described my invention, what I claim as new and useful is:

The combination with a fishing rod handle, of spaced clamps provided with projections mounted on the handle, and a flexible means secured to one of the clamp projections and adapted to be looped about the other clamp projection whereby the hand of an operator positioned in gripping relation to the handle may have some of the fingers of the hand located between the flexible member and the handle, and other fingers engaging the flexible member to maintain it on the said other clamp projection.

HARRY S. BOZORTH, Jr.

REFERENCES CITED

The following references are of record in the file of this patent:

UNITED STATES PATENTS

| Number | Name | Date |
|---|---|---|
| 467,202 | Rutz | Jan. 19, 1892 |
| 669,341 | Fyfe | Mar. 5, 1901 |
| 834,571 | Galbraith | Oct. 30, 1906 |
| 1,352,332 | Weinberg et al. | Sept. 7, 1920 |
| 1,887,950 | Siegel | Nov. 15, 1932 |